(12) United States Patent
Pai et al.

(10) Patent No.: US 10,320,645 B2
(45) Date of Patent: Jun. 11, 2019

(54) SYSTEM AND METHOD OF USING ATOMIC FLOW COUNTERS IN DATA CENTER SWITCHING

(71) Applicant: Cisco Technology, Inc., San Jose, CA (US)

(72) Inventors: Nalinaksh Pai, San Jose, CA (US); Ravikanth Nasika, San Jose, CA (US); Krishna Doddapaneni, San Jose, CA (US); Azeem Suleman, San Jose, CA (US); Rohit Puri, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 15/207,109

(22) Filed: Jul. 11, 2016

(65) Prior Publication Data

US 2018/0013653 A1 Jan. 11, 2018

(51) Int. Cl.
*H04L 12/26* (2006.01)
(52) U.S. Cl.
CPC .............................. *H04L 43/0894* (2013.01)
(58) Field of Classification Search
CPC ...... H04L 43/0894; H04L 47/32; H04L 47/27
See application file for complete search history.

(56) References Cited

U.S. PATENT DOCUMENTS

| 8,331,380 | B2 | 12/2012 | Smith et al. |
| 8,848,718 | B2 | 9/2014 | Hussain et al. |
| 8,958,310 | B2 | 2/2015 | Shrirang et al. |
| 2007/0237074 | A1 | 10/2007 | Curry |
| 2009/0225759 | A1* | 9/2009 | Hussain ............... H04L 43/026 370/395.1 |
| 2015/0256466 | A1 | 9/2015 | Roitshtein et al. |
| 2016/0330111 | A1* | 11/2016 | Manghirmalani .... H04L 43/028 |

* cited by examiner

*Primary Examiner* — Jackie Zuniga Abad
(74) *Attorney, Agent, or Firm* — Polsinelli PC

(57) ABSTRACT

Systems, methods and computer-readable storage devices each provide, for a given flow entry in a flow table associated with a packet flow, a first atomic counter associated with a first color and a second atomic counter associated with a second color. The system, for a first coloring interval, marks traffic in the packet flow from a tenant to a fabric as the first color and increments the first atomic counter. At a conclusion of the first coloring interval and for a second coloring interval, the system marks the traffic in the packet flow from the tenant to the fabric as the second color and increments the second atomic counter. The system compares first packet counts associated with the first color at an ingress point with second packet counts associated with the first color at an egress point to the fabric.

15 Claims, 4 Drawing Sheets

SYSTEM AND METHOD OF USING ATOMIC FLOW COUNTERS IN DATA CENTER SWITCHING

TECHNICAL FIELD

The disclosure relates generally to computer networking tools and mechanisms to integrate atomic flow counters into flow tables. With the atomic flow counters, the system can mark traffic in a flow at an ingress point with a specific color. Marking is carried through to the egress point such that at the egress point the system can compare data at the ingress counter and the egress counter to determine whether traffic forwarding issues are occurring in the datacenter fabric.

BACKGROUND

In datacenter fabrics, like an application centric infrastructure (ACI), an important troubleshooting step is to determine whether traffic forwarding issues, like drops, are caused by the datacenter fabric. Traditional packet counting techniques rely on comparing the egress and ingress counts for a given flow in order to determine whether the fabric is mis-forwarding the traffic. However, this is extremely difficult to achieve. Traffic that is constantly flowing is counted as part of the ingress and egress counts cannot be collected in an atomic fashion. In order to carry out granular atomic counting, interesting traffic must be identified ahead of time through changes in the configuration. The operator needs to know which flows need troubleshooting. Such a process renders the counting reactive in nature in that an operator needs to first detect a problem and then configure the required tenant parameters to atomically count packets.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
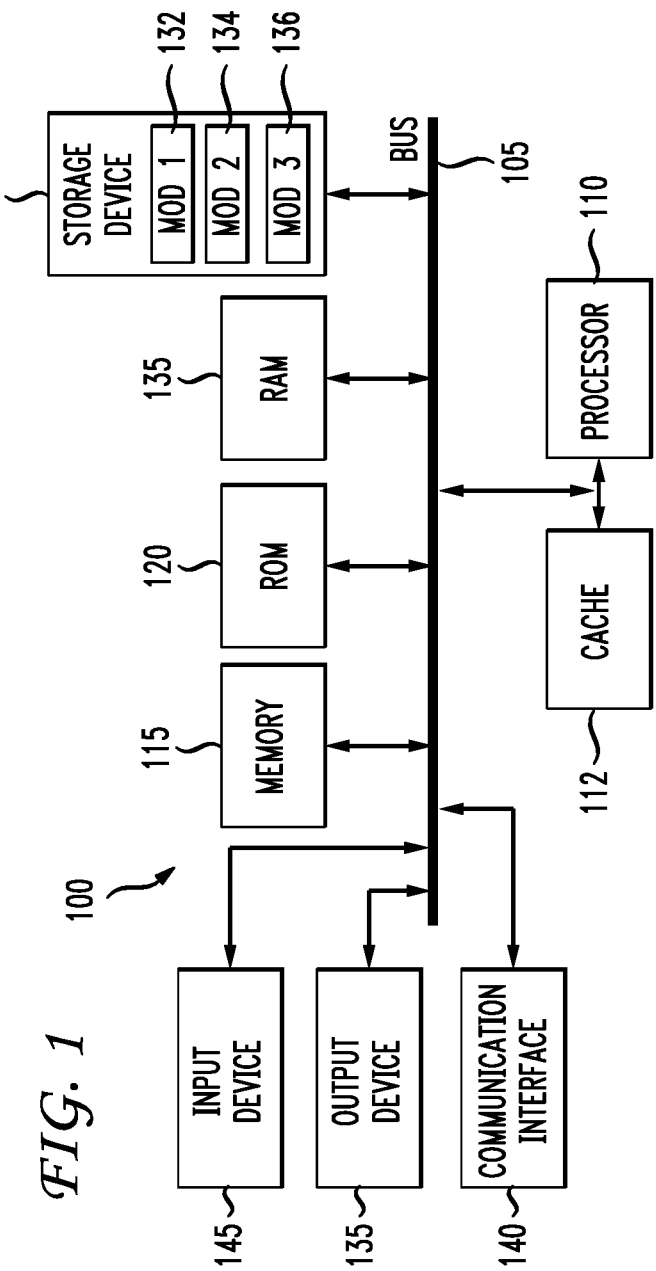
FIG. 1 illustrates the basic computing components of a computing device according to an aspect of this disclosure.

Disclosed are systems, methods and computer-readable devices related to improvements in identifying or determining whether traffic flow issues exist in a datacenter fabric. In a method example, the method includes, for a given flow entry in a flow table associated with a packet flow, providing a first atomic counter associated with a first color and a second atomic counter associated with a second color. A system, such as a switch or a device, will perform the steps of the method. For a first coloring interval, the system marks traffic in the packet flow from a tenant to a fabric as the first color and increments the first atomic counter. At a conclusion of the first coloring interval and for a second coloring interval, the system marks the traffic in the packet flow from the tenant to the fabric as the second color, increments the second atomic counter and compares first packet count associated with the first color at an ingress point with second packet count associated with the first color at an egress point to the fabric. Since the marking at the ingress is carried through to the egress switch, both the ingress and egress switches accounting stats use a counter bank specific to the color. When an accounting interval ends, the different color is chosen for marking the traffic. In this manner, no more packets are accounted against a previous color and the corresponding ingress and egress counters are frozen. The solution involves atomic counting in a proactive fashion at the granularity of a flow and atomic counts at both ingress and egress are available on a per flow basis the very first time a problem occurs.

The reference to a "color" can mean any approach to labeling or tagging a packet flow such as, for example, inserting a bit or bits into a package or some other data modification that "colors" the packet flow or assigns it a certain value. In another example, inserting 1 bit might be equated with coloring a packet flow red, while inserting 2 bits can be considered coloring the packet flow blue. Any other characteristic could apply as well, such as giving one packet flow a number and a second packet flow another number, or a type of car, or an image, video, label, or a type of animal or any other distinguishing characteristic that can identify one packet flow relative to another.

Description

The present disclosure addresses the Internet-centric need of how to detect whether an issue with a packet flow between an ingress point and an egress point from a datacenter fabric is caused by the fabric. In order to address this problem, atomic counters are added to flow entries in a flow table that records data associated with packet flows. We begin with a brief description of flow tables. Each switch in a datacenter can maintain a number of flow tables, with each flow table containing a list of flow entries. Each entry contains a match field that defines the flow, a counter and a set of instructions. Entries in the match field contain either a specific value against which the corresponding parameter in the incoming packet is compared or a value indicating that the entry is not included in the respective flow's parameter set. Flow tables are numbered beginning with table zero, with incoming packets first compared to flow table entries in table zero. When a match is found, the flow counter is incremented and the specified set of instructions is carried out.

A new flow must be created when a packet arrives that does not match any flow table entry. The switch may have been configured to simply drop packets for which no flow has been defined, but in most cases, the packet will be sent to the controller. The controller then defines a new flow for that packet and creates one or more flow table entries. It then sends the entry or entries to the switch to be added to flow tables. Finally, the packet is sent back to the switch to be processed as determined by the newly created flow entries.

Flow table instructions modify the action set associated with each packet. Packets begin processing with an empty action set. Actions can specify that the packet be forwarded through a specified port or modify packet TTL, VLAN, MPLS tags or packet QOS.

Instructions in the first flow table can carry out an action on the packet or add actions to be carried out later. Instructions can also direct packet processing to continue by comparing it to entries in another flow table. A flow entry in a subsequent table can contain instructions that add further actions, delete or modify actions added earlier or carry out actions.

An instruction can also add a metadata value to a packet before sending it to the next flow table. That value becomes an additional parameter to be matched against the metadata value in flow table entries in the next table. Processing continues table by table until all specified instructions have been completed and the packet has been forwarded.

The atomic counters mark 'interesting' traffic with a specific color. At any given time interval, the 'interesting' traffic going from a tenant to the datacenter fabric is marked with a color. This marking is carried through to the egress top of rack (TOR) switch. Both the ingress and egress TORS account stats using a counter bank specific to that color. When the accounting interval ends, a different color is chosen for marking the traffic. This way, no more packets will be accounted against the previous color and the corresponding ingress and egress counters are frozen. With the above procedure, one can carry out granular atomic accounting and the interesting traffic need not be identified ahead of time through configuration. By having the atomic counters in every flow of the flow table, it is possible with aggressive scans of the flow table to ensure that every flow through a switch is accounted for using the atomic counters.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
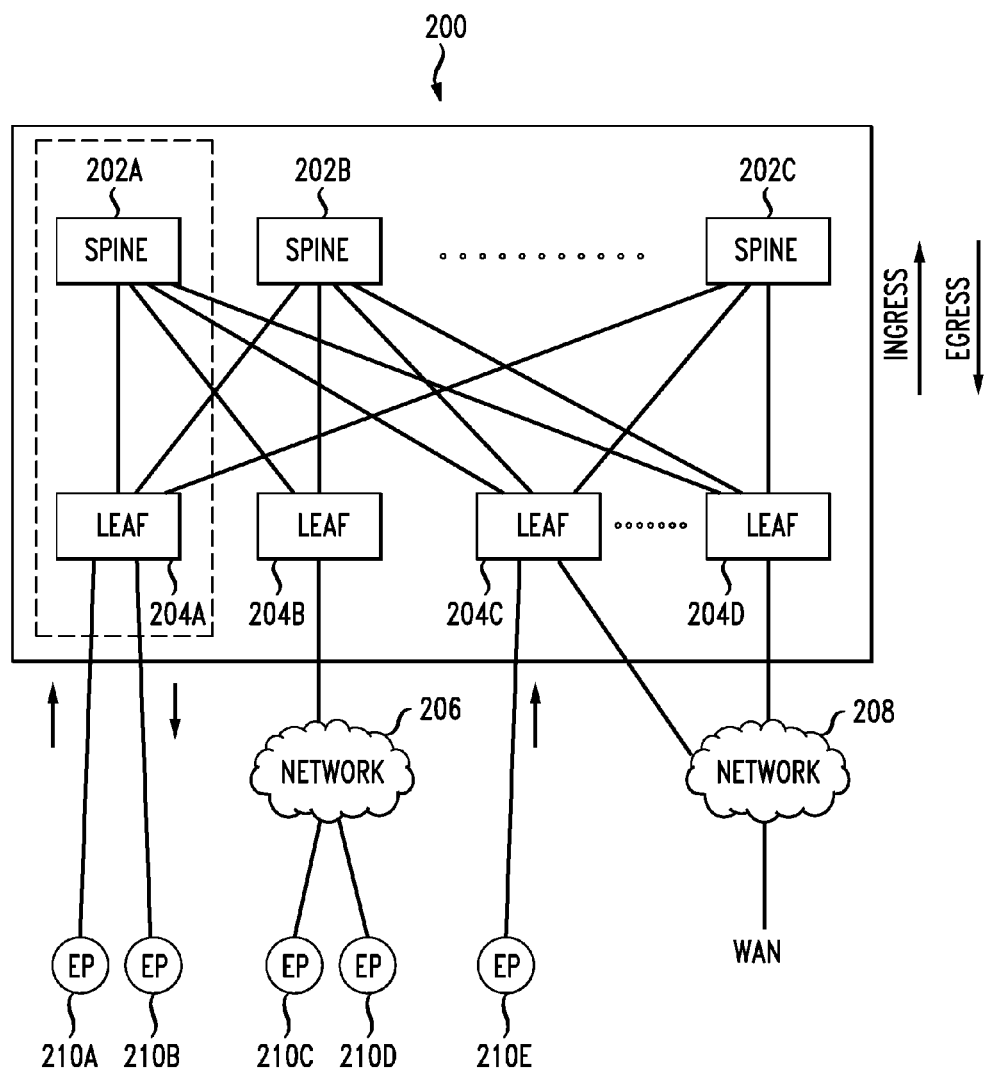
FIG. 2 illustrates several network components that illustrate the general environment of packet flows.
Figure 3:
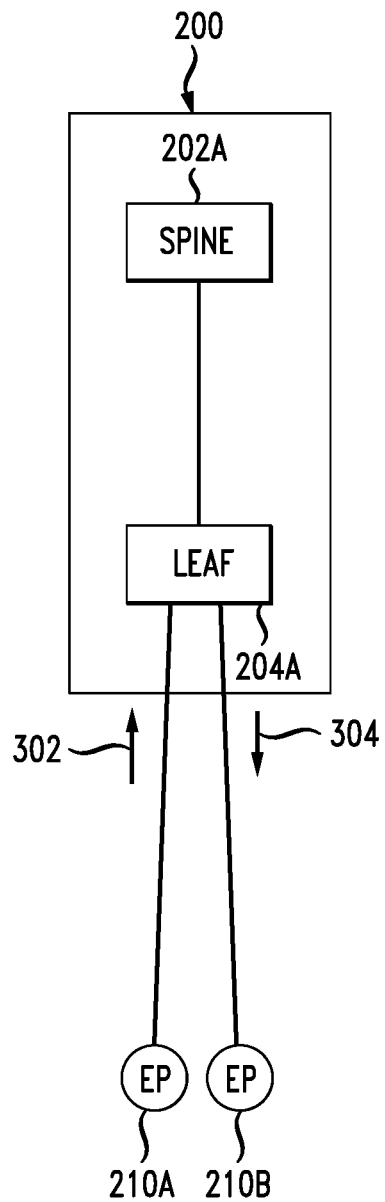
FIG. 3 illustrates a simplified version of FIG. 2 to show more specifically an ingress flow and an egress for a packet flow.

Having discussed the basic computing components that can apply to a system example of the present disclosure, we now turn to a system, method and computer-readable medium or device according to various aspects of the present disclosure. FIG. 2 illustrates the general context of a datacenter fabric 200 and other components to which this disclosure applies. Within the datacenter fabric 200 are a number of components including three examples spines 202A, 202B and 202C and leaf components. This figure represents generally the spine and leaf architecture but which can encompass other architectures as well. The spine can represent, for example, a Cisco Nexus 9336 PQ ACI spine switch. Leaf switches 204A, 204B and 204C are also shown. Servers and storage devices are represented by 210A, 210B, 210C, 210D and 210E. In one aspect such devices can be called "tenants" of the fabric 200. The leaf switches 204A, 204B and 204C mesh into the spine switches 202, 202B, 202C, and form the access layer that delivers the network connection points for the servers/other devices 210A, 210B, 210C, 210D and 210E. Leaf nodes 204C and 204D are also shown as providing network connection points for a network 208 connected to a Wide Area Network (WAN). Nodes 210C and 210D communicate with leaf node through a network 206. As noted in FIG. 2, several ingress packet flows are shown respectively from node 210A and 210E as well as an egress packet flow to node 210B FIG. 3 illustrates a simplified version of FIG. 2 to discuss the ingress and egress of a packet flow. The ingress packet flow 302 is shown as representing packets flowing from node 210A to leaf node 204A. The packets can flow to the spine switch 202A and out through the leaf switch 204A to node 210B in an egress path 304.

Figure 4:
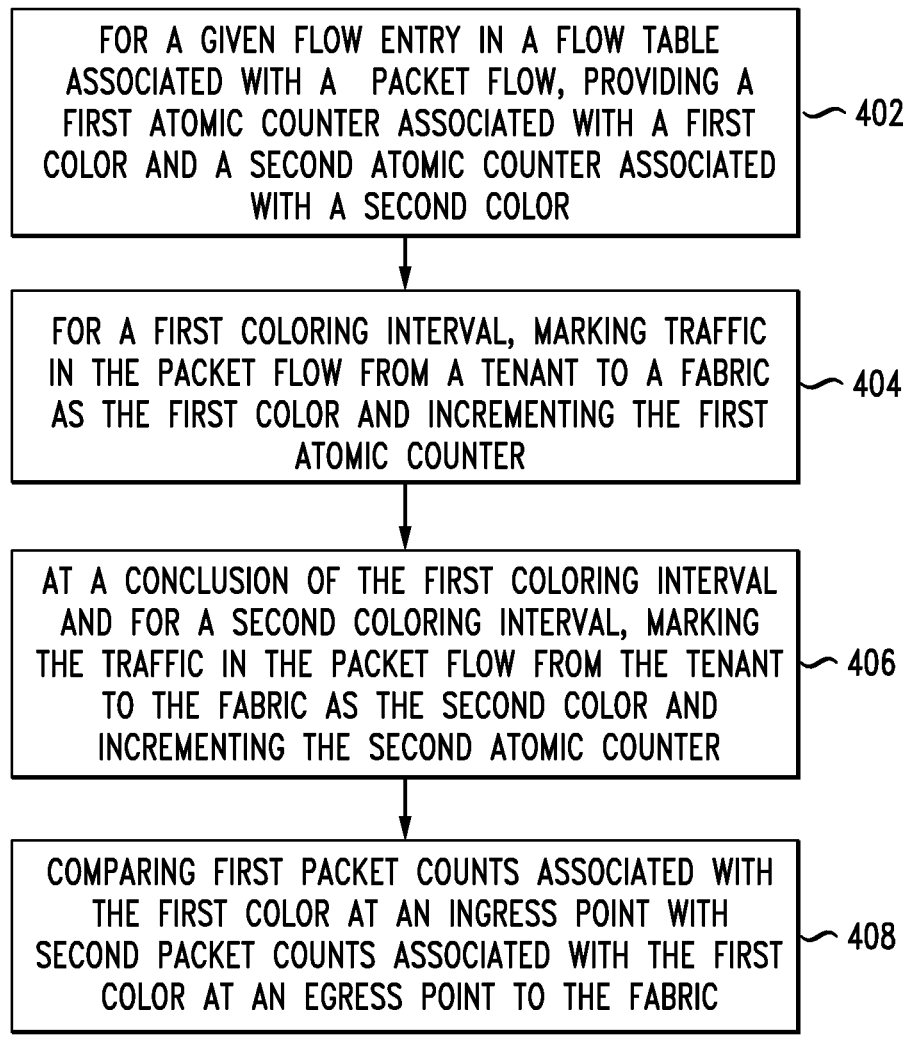
FIG. 4 illustrates a method example of this disclosure.

FIG. 4 illustrates a method aspect of this disclosure. The method can be performed by any component, system, device, switch, leaf node, and so forth in a network. These shall generally be called "systems". As shown in FIG. 4, a system, for a given flow entry in a flow table associated with a packet flow, provides a first atomic counter associated with a first color and a second atomic counter associated with a second color (402). The system, for a first coloring interval, marks traffic in the packet flow from a tenant to a datacenter fabric 200 as the first color and increments the first atomic counter (404). At a conclusion of the first coloring interval and for a second coloring interval, the system marks the traffic in the packet flow from the tenant to the fabric as the second color and increments the second atomic counter (406). In this manner, no more packets are accounted against a previous color and the corresponding ingress and egress counters are frozen. The system compares first packet counts associated with the first color at an ingress point with second packet counts associated with the first color at an egress point to the fabric (408).

The system can add up counts of the first color at both the ingress point 302 and the egress point 304. The system can increment both the first atomic counter and the second atomic counter for a packet in the packet flow due to the packet being within a window that straddles an interval boundary between the first coloring interval and the second coloring interval. The system can compare first packet counts associated with the first color at the ingress point with second packet counts associated with the first color at the egress point to the fabric to yield a comparison. When the comparison indicates a different number of packets at the ingress point relative to the egress point, the system can determine that a packet issue exists. For example, the packet issue can be a drop of packets in the datacenter fabric, improper forwarding of packets, an error in packet flow, added packets, and so forth. At the conclusion of the first coloring interval, and after the incrementing of the first atomic counter, the first atomic counter is frozen for use in counting packets at the egress point having the first color.

"Coloring" as the term is used herein can mean any approach to inserting a bit or bits in the packet flow, labeling the packet flow, tagging the packet flow such as, for example, inserting a bit or bits into a packet or some other data modification that "colors" the packet flow or assigns it a certain value. Bits can be switched around in the packet flow thus producing a marker. In another example, inserting 1 bit might be equated with coloring a packet flow red (say with a 0 value of the bit) or blue (say with a 1 value of the bit). Two bits can be used to represent 4 colors, and so forth. Any other characteristic could apply as well, such as giving one packet flow a number and a second packet flow another number, or a type of car, or an image, video, label, or a type of animal or any other distinguishing characteristic that can identify one packet flow relative to another.

The solution disclosed herein addresses the previous reactionary nature to using atomic counting to identify the reason for packet loss. Disclosed herein is an approach that involves atomic counting in a proactive fashion at the granularity of a flow and atomic counts at both ingress and egress are available on a per flow basis the very first time a problem occurs. Ultimately, it is possible to precisely determine for a given flow how many packets entered the fabric and how many left the fabric, along with the entry and exit top-of-rack switches.

The various aspects disclosed herein can be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the examples. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, computer-readable storage device, or a machine-readable medium excludes signals or signals embodied in carrier waves.

The steps associated with the methods of the present disclosure may vary widely. Steps may be added, removed, altered, combined, and reordered without departing from the spirit of the scope of the present disclosure. For example, reference to a "color" can mean any use of inserting a bit or bits into a packet flow or some other data modification that "colors" the packet flow or assigns it a certain value. Therefore, the present examples are to be considered as illustrative and not restrictive, and the examples is not to be limited to the details given herein, but may be modified within the scope of the appended claims.

What is claimed is:

1. A method comprising:
    for a given flow entry in a flow table associated with a packet flow, providing a first atomic counter associated with a first color and a second atomic counter associated with a second color;
    for a first coloring time interval, marking traffic in the packet flow from a tenant to a fabric as the first color and incrementing the first atomic counter;
    at a conclusion of the first coloring time interval and for a second coloring time interval, marking the traffic in the packet flow from the tenant to the fabric as the second color and incrementing the second atomic counter;
    comparing first packet counts associated with the first color at an ingress point with second packet counts associated with the first color at an egress point to the fabric; and
    incrementing both the first atomic counter and the second atomic counter for a packet in the packet flow due to the packet being within a window that straddles an interval boundary between the first coloring time interval and the second coloring time interval.

2. The method of claim 1, further comprising adding up counts of the first color at both the ingress point and the egress point.

3. The method of claim 1, wherein the comparing of the first packet counts associated with the first color at the ingress point with the second packet counts associated with the first color at the egress point to the fabric yields a comparison, and wherein the method further comprises:
    when the comparison indicates a different number of packets at the ingress point relative to the egress point, determining that a packet issue exists.

4. The method of claim 3, wherein the packet issue comprises a drop of packets in the fabric.

5. The method of claim 1, wherein at the conclusion of the first coloring time interval, and after the incrementing of the first atomic counter, the first atomic counter is frozen for use in counting packets at the egress point having the first color.

6. A system comprising:
    a processor; and
    a computer-readable medium, storing instructions which, when executed by the processor, cause the processor to perform operations comprising:
        for a given flow entry in a flow table associated with a packet flow, providing a first atomic counter associated with a first color and a second atomic counter associated with a second color;
        for a first coloring time interval, marking traffic in the packet flow from a tenant to a fabric as the first color and incrementing the first atomic counter;
        at a conclusion of the first coloring time interval and for a second coloring time interval, marking the traffic in the packet flow from the tenant to the fabric as the second color and incrementing the second atomic counter; and
        comparing first packet counts associated with the first color at an ingress point with second packet counts associated with the first color at an egress point to the fabric;
        incrementing both the first atomic counter and the second atomic counter for a packet in the packet flow due to the packet being within a window that straddles an interval boundary between the first coloring time interval and the second coloring time interval.

7. The system of claim 6, wherein the computer-readable medium stores further instructions which, when executed by the processor, cause the processor to perform further operations comprising adding up counts of the first color at both the ingress point and the egress point.

8. The system of claim 6, wherein the comparing of the first packet counts associated with the first color at the ingress point with the second packet counts associated with the first color at the egress point to the fabric yields a comparison, and wherein the computer-readable medium stores further instructions which, when executed by the processor, cause the processor to perform further operations comprising:
when the comparison indicates a different number of packets at the ingress point relative to the egress point, determining that a packet issue exists.

9. The system of claim 8, wherein the packet issue comprises a drop of packets in the fabric.

10. The system of claim 6, wherein at the conclusion of the first coloring time interval, and after the incrementing of the first atomic counter, the first atomic counter is frozen for use in counting packets at the egress point having the first color.

11. A computer-readable storage device storing instructions which, when executed by a processor, cause the processor to perform operations comprising:
for a given flow entry in a flow table associated with a packet flow, providing a first atomic counter associated with a first color and a second atomic counter associated with a second color;
for a first coloring time interval, marking traffic in the packet flow from a tenant to a fabric as the first color and incrementing the first atomic counter;
at a conclusion of the first coloring time interval and for a second coloring time interval, marking the traffic in the packet flow from the tenant to the fabric as the second color and incrementing the second atomic counter; and
comparing first packet counts associated with the first color at an ingress point with second packet counts associated with the first color at an egress point to the fabric;
incrementing both the first atomic counter and the second atomic counter for a packet in the packet flow due to the packet being within a window that straddles an interval boundary between the first coloring time interval and the second coloring time interval.

12. The computer-readable storage device of claim 11, wherein the computer-readable storage device stores further instructions which, when executed by the processor, cause the processor to perform further operations comprising adding up counts of the first color at both the ingress point and the egress point.

13. The computer-readable storage device of claim 11, wherein the comparing of the first packet counts associated with the first color at the ingress point with the second packet counts associated with the first color at the egress point to the fabric yields a comparison, and wherein the computer-readable storage device stores further instructions which, when executed by the processor, cause the processor to perform further operations comprising:
when the comparison indicates a different number of packets at the ingress point relative to the egress point, determining that a packet issue exists.

14. The computer-readable storage device of claim 13, wherein the packet issue comprises a drop of packets in the fabric.

15. The computer-readable storage device of claim 11, wherein at the conclusion of the first coloring time interval, and after the incrementing of the first atomic counter, the first atomic counter is frozen for use in counting packets at the egress point having the first color.

* * * * *